United States Patent
Padron

[19]

[11] Patent Number: 5,951,868
[45] Date of Patent: Sep. 14, 1999

[54] SYSTEM AND METHOD FOR SEPARATION OF CRUDE OR HYDROCARBON FREE AND/ OR DISPERSE IN WATER

[75] Inventor: Aaron Padron, Caracas, Venezuela

[73] Assignee: Intevep, S.A., Caracas, Venezuela

[21] Appl. No.: 08/934,240

[22] Filed: Sep. 19, 1997

[51] Int. Cl.$^6$ .......................... B01D 11/00; B01D 17/028
[52] U.S. Cl. .......................... 210/634; 196/46; 208/187; 210/511; 210/519; 210/521; 210/644; 210/801
[58] Field of Search .................. 210/295, 511, 210/513, 519, 521, 532.1, 634–643, 644, 689, 691, 749, 800, 804, 806, 649, 799, 801, DIG. 5; 208/187, 188; 196/46, 46.1

[56] References Cited

U.S. PATENT DOCUMENTS

| | | | |
|---|---|---|---|
| 1,985,591 | 12/1934 | Welsh | 210/634 |
| 4,022,688 | 5/1977 | Wikholm | 210/519 |
| 4,406,789 | 9/1983 | Brignon | 210/519 |
| 5,437,799 | 8/1995 | Kissler | 210/511 |

*Primary Examiner*—Joseph W. Drodge
*Attorney, Agent, or Firm*—Bachman & LaPointe, P.C.

[57] ABSTRACT

The present invention relates to a system and a method for separating a hydrocarbon containing material such as crude oil from water. The system of the present invention includes a treatment tank, a layer of a fluid having a chemical affinity for the hydrocarbon contain material being separated within the tank for separating the hydrocarbon containing material from said water without any mixing and with a minimum level of turbulence, and a distribution system for introducing the water with the hydrocarbon containing material into the layer of chemical affinity fluid. The method of the present invention broadly comprises the steps of providing a treatment tank having a layer of a fluid having a chemical affinity for the hydrocarbon containing material and separating the hydrocarbon containing material from the water without any mixing and with a minimum of turbulence by introducing the water with the hydrocarbon containing material into the layer of chemical affinity fluid.

16 Claims, 4 Drawing Sheets

SYSTEM AND METHOD FOR SEPARATION OF CRUDE OR HYDROCARBON FREE AND/ OR DISPERSE IN WATER

BACKGROUND OF THE INVENTION

The present invention relates to a system and a method for separating a hydrocarbon containing material such as crude oil from water.

Water effluent from many dehydration and dewatering processes contain crude oil or other hydrocarbon containing materials, either in free form or dispersed in the water. It is necessary to separate the crude oil or other hydrocarbon containing material from the water if the water is to be re-used. A conventional system for treating water effluent containing crude oil from a water dehydration system is shown in FIG. 1. As shown therein, water coming from a dehydration tank 10 is drained into a separator 12 wherein crude oil, or droplets of crude, having a size greater than 150 microns is separated. The system also includes a mechanical separation device 14 formed by a series of plates which gravitationally separate those droplets with a size between 50 and 150 microns and a gas or air floatation device 16 wherein droplets with a size between 20 and 30 microns are separated. Still further, the system includes a final stage filter 18 filled with sand or synthetic material to obtain water with a quality suitable for re-use.

This type of system and process is expensive and time consuming. There remains a need for a system and a process which is cheaper and more efficient. There also remains a need for a process which lends itself to the treatment of water effluents containing a wide range of crude oil or other hydrocarbon containing materials.

SUMMARY OF THE INVENTION

Accordingly, it is an object of the present invention to provide a system for separating crude oil and/or other hydrocarbon containing material from water at a reduced cost and in a more efficient manner.

It is a further object of the present invention to provide a method for separating crude oil and/or other hydrocarbon containing material from water at a reduced cost and in a more efficient manner.

It is yet a further object of the present invention to provide a system and a method as above which lends itself to separating a wide range of crude oils and/or hydrocarbon containing materials from water.

The foregoing objects are attained by the system and the method of the present invention.

In accordance with the present invention, the system for separating a hydrocarbon containing material, such as crude oil, from water includes a treatment tank, a layer of a fluid having a chemical affinity for the hydrocarbon containing material being separated within the tank in order to separate the hydrocarbon containing material from said water without any mixing and with a minimum level of turbulence, and a distribution system for introducing the water with the hydrocarbon containing material into the layer of chemical affinity fluid.

The method of the present invention for separating hydrocarbon containing material such as crude oil from water effluent broadly comprises the steps of providing a treatment tank having a layer of a fluid having a chemical affinity for the hydrocarbon containing material and separating the hydrocarbon containing material from the water without any mixing and with a minimum of turbulence by introducing the water with the hydrocarbon containing material into the layer of chemical affinity fluid.

Other details of the system and the method of the present invention, as well as other objects and advantages attendant thereto, are set forth in the following detailed description and the accompanying drawings in which like reference numerals depict like elements.

DETAILED DESCRIPTION OF THE PREFERRED EMBODIMENT(S)

Figure 1:
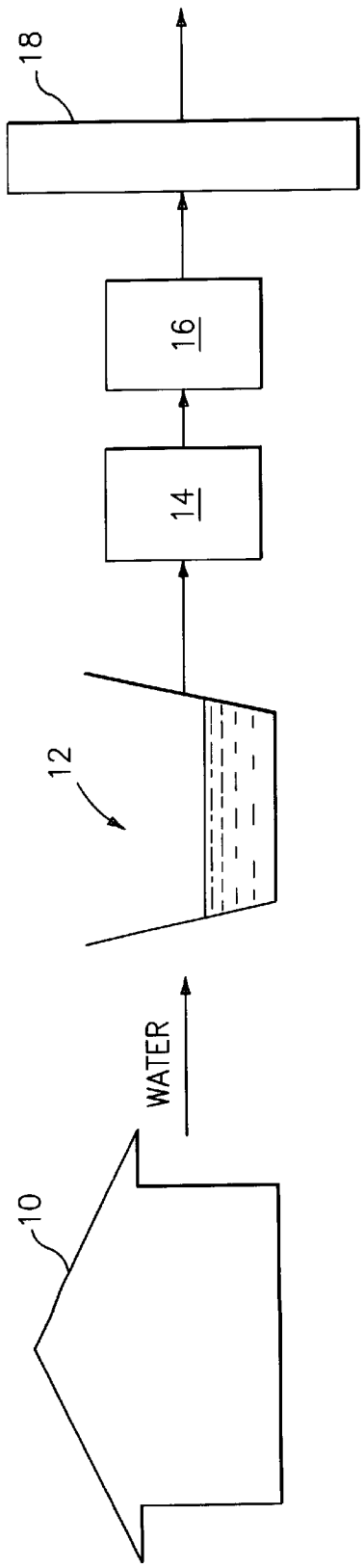
FIG. 1 is a schematic representation of a prior art system for treating water effluent containing crude oil.
Figure 2:
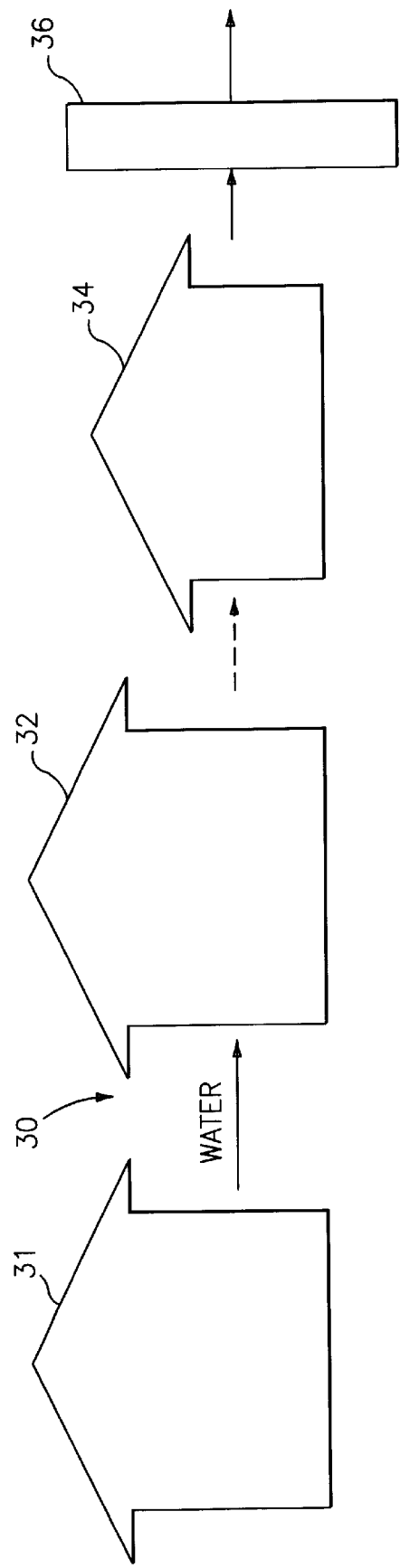
FIG. 2 is a schematic representation of a system for treating water effluent containing crude oil and/or other hydrocarbon material in accordance with the present invention.

Referring now to the drawings, FIG. 2 illustrates a system for processing water effluent in accordance with the present invention. The system 30 includes a treatment tank 32 for receiving water effluent containing crude oil or other hydrocarbon containing material from a dehydration system 31. The dehydration system does not form part of the present invention and may be any dehydration system known in the art. The crude oil or hydrocarbon containing material may be free or dispersed in the water. As will be discussed hereinafter, the water effluent entering the tank 32 is treated to separate the water from the crude oil or other hydrocarbon containing material. After being treated in the tank 32, the water passes through a sedimentation tank 34 and a filter 36. The sedimentation tank 34 includes a baffle (not shown) which acts to reduce the velocity of the fluid as it is introduced into the sedimentation tank. As the velocity of the fluid is reduced, the flocculation of the sediment particles is promoted. The increase in size and weight of the sediment particles due to flocculation allow the particles to settle out in the sedimentation tank and can later be removed from the sedimentation tank in a manner known in the art. The filter, located downstream of the sedimentation tank, removes those particle fines which are not of sufficient size and weight to settle out in the sedimentation tank. The combination of the sedimentation tank and filter insures that the water emerging therefrom is of good quality with regard to solid particulate matter, that is, less than or equal to 10 ppm solids. The filter 36 may comprise any suitable final stage filter known in the art such as one filled with sand or synthetic material.

Figure 3:
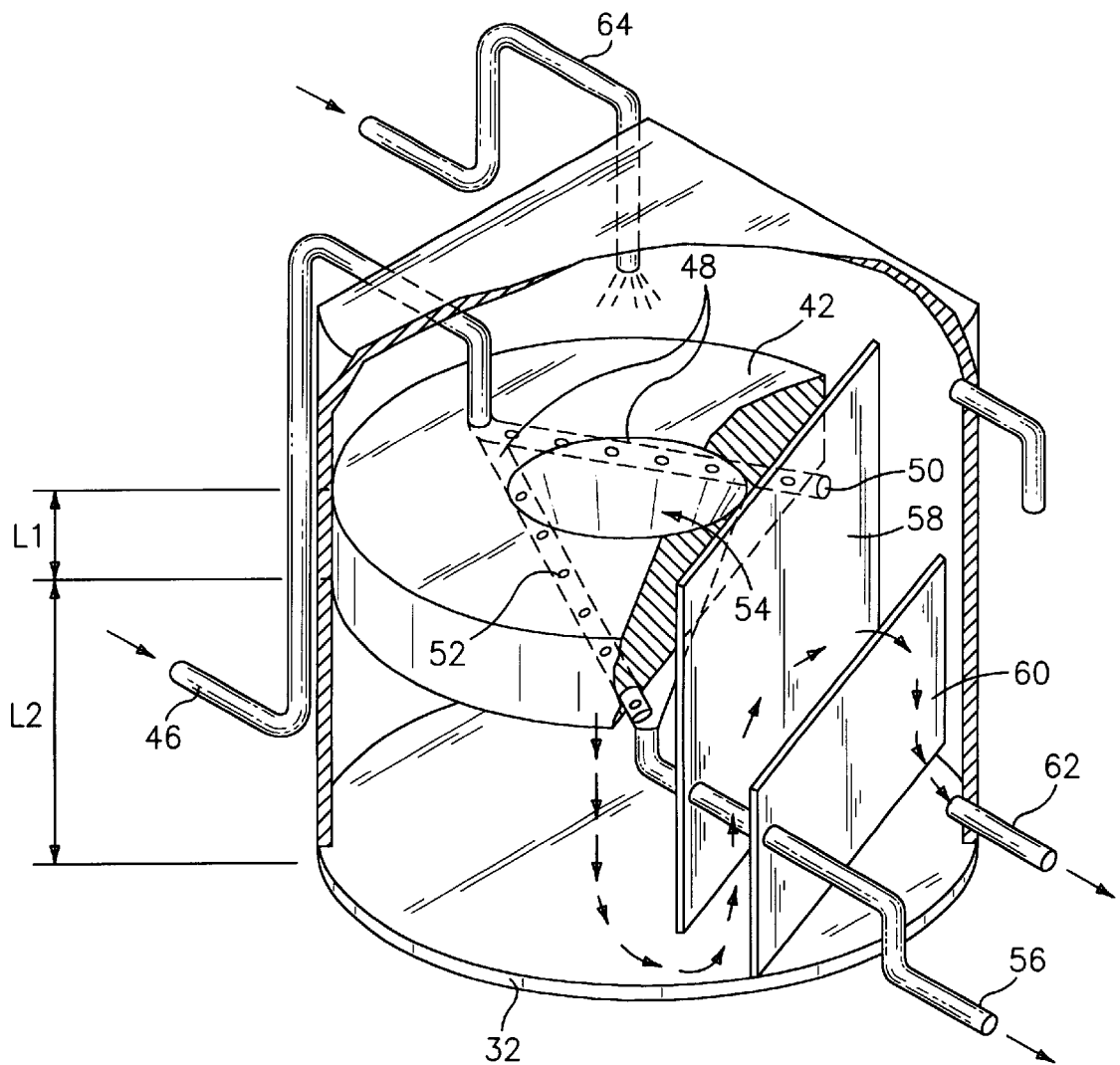
FIG. 3 illustrates a treatment tank used in the system of FIG. 2.

As previously discussed, crude oil and/or other hydrocarbon containing material is separated from the water in the treatment tank 32. Referring now to FIG. 3, the treatment tank 32 contains a layer 42 of a fluid for separating any crude oil and/or any other hydrocarbon containing material from the water by chemical affinity. The fluid in the layer 42 preferably is one that has a chemical affinity with the crude oil or other hydrocarbon containing material to be separated and which allows the substantially instantaneous or very fast dilution of the hydrocarbon phase without the help of any mixing system and with a minimum turbulence inside the layer 42.

The fluid layer 42 preferably floats on a fluid layer 44 such as a layer of water and has a depth of from about 1.0 to about 1.5 meters. For ease of discussion, the fluid in the layer 42 will be referred to as the affinity fluid.

The effluent water to be treated is introduced into the tank 32 via inlet conduit 46. A fluid distribution system 48 is located at an end of the conduit 46. The fluid distribution system 48 consists of one or more pipes 50 immersed in the fluid layer 42, preferably towards the bottom of the fluid layer 42. The pipe(s) 50 contain(s) a number of holes 52 along their top edges for introducing the water effluent containing the crude oil and/or any other hydrocarbon containing material into the affinity fluid. It has been found that this type of distribution system helps create a substantially homogeneous mixture of crude oil and/or any other hydrocarbon containing material with the affinity fluid, thus promoting the desired separation of water and crude oil and/or any other hydrocarbon containing material.

The number of holes 52 required in the distribution system may be calculated using the following equation:

$$n = V\pi D^2 / 4Q$$

wherein
- n=total number of holes in pipe(s) 50;
- V=velocity of the effluent water through pipe(s) 50;
- D=average diameter of the pipe(s) 50; and
- Q=flow rate of the water effluent through pipe(s) 50.

As the crude oil or other hydrocarbon material in the water is separated from the water by the affinity fluid, it is drained through a funnel 54 located towards the upper end of the layer 42 into a conduit 56. The conduit 56 transports the separated crude oil and/or other hydrocarbon containing material to a collection tank (not shown).

After contacting and passing through the layer 42, the water still contains droplets of crude oil or other hydrocarbon containing material. To separate these droplets from the stream of water, a plurality of baffles 58 and 60 are provided. The baffles may be designed using Stoke's law so that water travels under the baffle 58 and over the baffle 60 so as to cause the droplets in the water to rise to a level which is substantially the upper level of the affinity fluid. For example, the baffles may be designed to have a height which corresponds to one droplet of crude oil of 20° API having a size of 150 microns ascending at a rate twice that of the velocity at which a water droplet will descend. The water droplet velocity can be determined in a known manner using Stoke's law. The water passing over the baffle 60 from which droplets of crude oil or other hydrocarbon containing material have been separated, then enters conduit 62 and is passed to the sedimentation tank 34.

The tank 30 also includes a conduit 64 for introducing more affinity fluid into the tank so as to maintain a desired height for the layer 42. It is desirable when using the treatment system and process of the present invention to maintain a ratio of affinity fluid height L1 to water height L2 in the range of from about 0.50:1.00 to about 1.00:1.00. Any suitable sensing means known in the art may be provided to measure the depths L1 and L2.

It has been found that in the case of crude oils or hydrocarbon containing materials with gravities lower than 10° API, the affinity fluid should be a solvent, such as an organic solvent, having a gravity of at least about 20° API. In the case of crude oils or hydrocarbon containing materials having a gravity higher than 10° API, the affinity fluid may be any solvent, such as an organic solvent, with a higher or substantially equal gravity to the crude oil or hydrocarbon containing material that needs to be separated. Particularly suitable solvents include kerosine, naphtha and aromatic solvents.

In order to demonstrate the benefits attainable by the system and process of the present invention, the following example is offered. A test was carried out using water coming from a Zuata crude dehydration process. Zuata crude has the following characteristics: a density at 15° C. of 1.005 kg/l; API gravity at 60° F. of 9.3; kinetic viscosity at 100° F. of 11,936 cSt, kinetic viscosity at 140° F. of 1,654 cSt; and a sulphur content, % M/M of 3.35.

Figure 4:
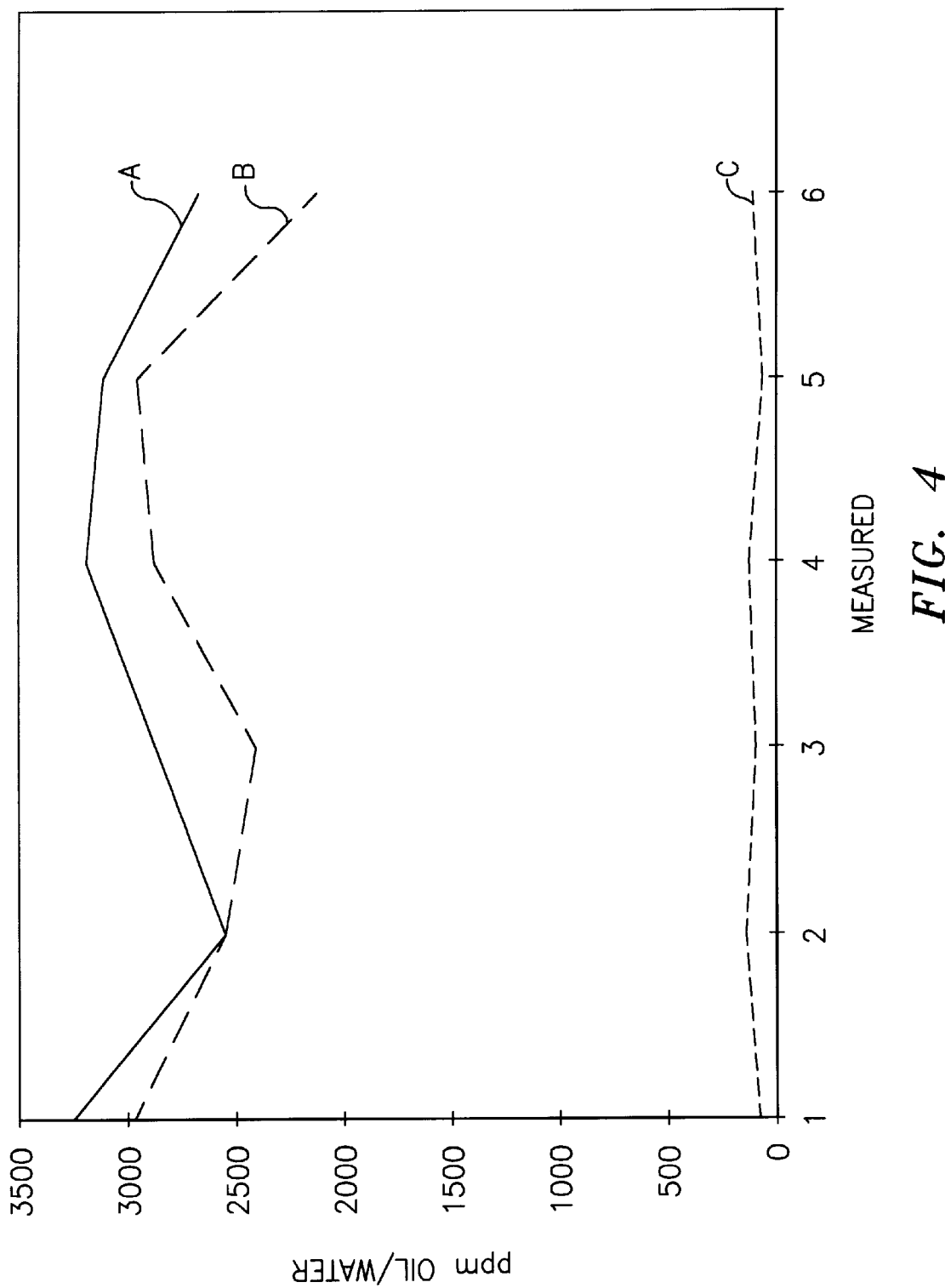
FIG. 4 is a graph showing the reduction in the oil content in water which can be obtained using the system and the method of the present invention.

In a first part of the test, a tank such as that shown in FIG. 3 was used as a surge tank. In a second part of the test, the tank was used in accordance with the present to invention as a chemical affinity tank by using a 32° API gravity crude having a depth of 1.5 meters as an affinity fluid. During the tests, the total oil content in the water was measured at the inlet and the outlet of the tank by Ultraviolet methodology. FIG. 4 shows the results of the tests where total oil content in the water was reduced from around 3000 ppm at the inlet (Line A) to less than 20 ppm using the system and the process of the present invention (Line C). As shown in this figure, the tank when used as a surge tank (Line B) did not substantially reduce the oil content in the water.

Figure 5:
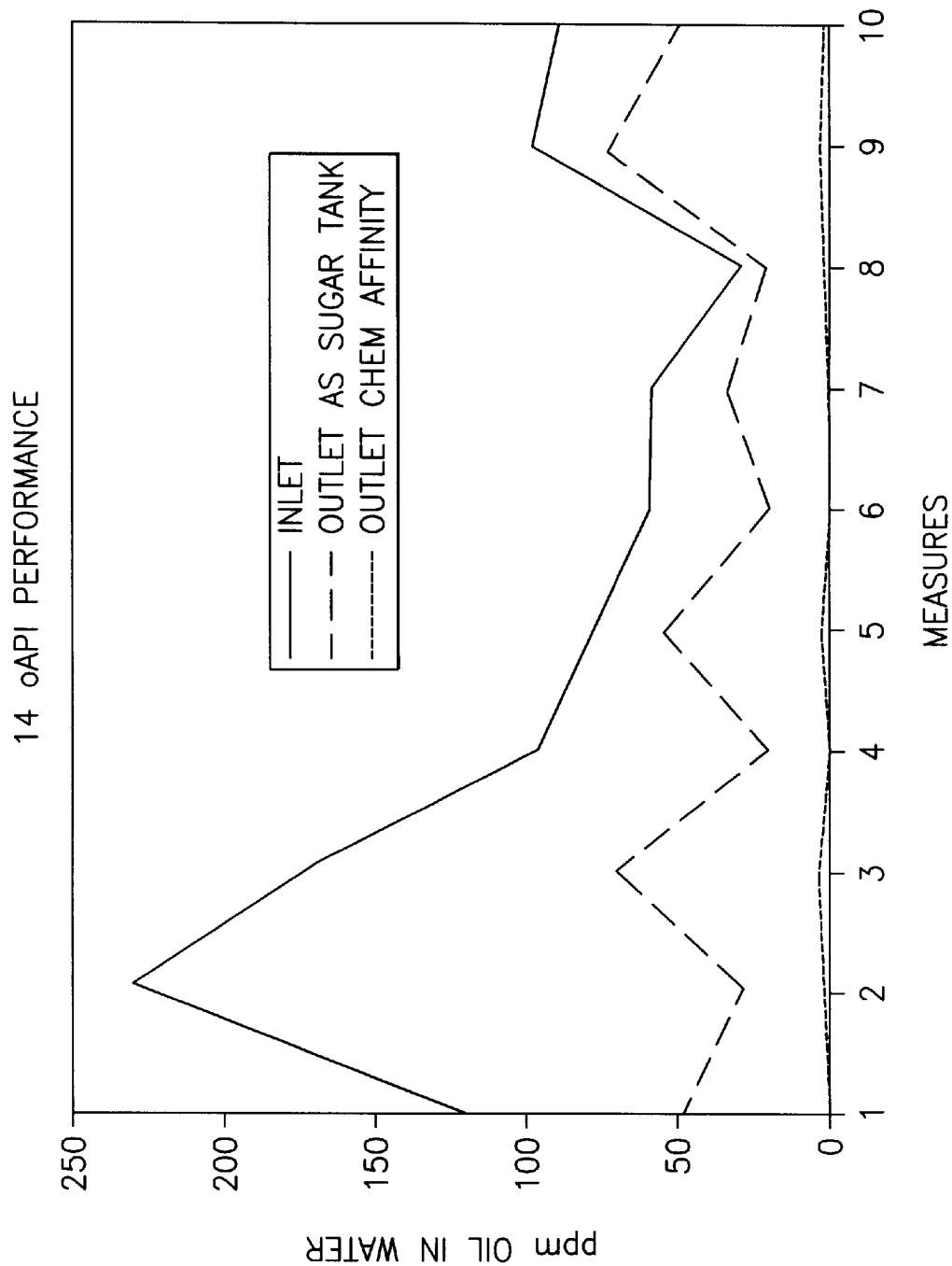
FIG. 5 is a graph similar to FIG. 4 for Zuata Crude diluted to 14° API.

A second test was conducted as before using Zuata crude diluted to 14° API. FIG. 5 shows the results of the test. As can be seen from this figure, the affinity tank performance with API crude oil higher than 10° obtained similar results.

It is apparent that there has been provided in accordance with the present invention a system and a method for separating crude oil from effluent water which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for separating a hydrocarbon containing material from water comprising:
    a treatment tank;
    a fluid bath within said tank for separating said hydrocarbon containing material from said water without introducing turbulence, said fluid bath comprises a first layer of a fluid having a chemical affinity for said hydrocarbon containing material which floats on a second layer of water;
    means for introducing an effluent water comprising said water with said hydrocarbon containing material into said first layer, wherein said means for introducing includes distributing means comprising at least one pipe positioned at a lower level of said first layer of chemical affinity fluid, said at least one pipe having a plurality of openings; and
    means for removing a separated water stream from said tank.

2. The system of claim 1 wherein the number of openings in said at least one pipe having a plurality of openings is determined by the equation:

$$n = V\pi D^2 / 4Q$$

wherein
- n=total number of holes in said at least one pipe;
- V=velocity of the effluent water through said at least one pipe;

D=average diameter of said at least one pipe; and

Q=flow rate of the effluent water through said at least one pipe when said means for introducing is operating.

3. The system of claim 1 further comprising:

means for collecting said hydrocarbon containing material separated from said water, said collecting means being located at an upper level of said layer of chemical affinity fluid above said lower level.

4. The system of claim 3 wherein said collecting means comprises a funnel which communicates with a first outlet pipe.

5. The system of claim 1 wherein said chemical affinity fluid comprises an organic solvent having an API gravity greater than at least about 20° when said hydrocarbon containing material has a gravity lower than 10° API.

6. The system of claim 1 wherein said chemical affinity fluid comprises an organic solvent having a gravity equal to the gravity of the hydrocarbon containing material when the hydrocarbon containing material has a gravity greater than 10° API.

7. The system of claim 1 wherein said chemical affinity fluid comprises an organic solvent having a gravity higher than the gravity of the hydrocarbon containing material when the hydrocarbon containing material has a gravity greater than 10° API.

8. The system of claim 1 further comprising baffle means within said tank for separating droplets of said hydrocarbon containing material from said separated water stream emerging from said tank.

9. The system of claim 1 wherein the first layer has a depth L1, the second layer has a depth L2, and the ratio of the depth L1:L2 is in the range of from about 0.50:1.00 to about 1.00:1.00.

10. The system of claim 1 wherein said hydrocarbon containing material is crude oil and said first layer of affinity fluid comprises a solvent which promotes separation of said crude oil from said water by contact and chemical affinity.

11. A method for separating hydrocarbon containing material from water comprising:

providing a treatment tank having a first layer of a fluid having a chemical affinity for said hydrocarbon containing material floating on a second layer of water;

separating said hydrocarbon containing material from said water without any mixing and with a minimum of turbulence by introducing said water with said hydrocarbon containing material into said first layer of chemical affinity fluid at the bottom of said first layer through a distributing means comprising at least one pipe having a plurality of openings for distributing said water with said hydrocarbon containing material homogeneously in said first layer; and removing a separated water stream from said tank.

12. The method of claim 11 wherein said chemical affinity fluid comprises an organic solvent having a specific gravity of at least about 20° API when said hydrocarbon containing material has a gravity lower than 10° API.

13. The method of claim 11 wherein said chemical affinity fluid comprises an organic solvent having a specific gravity substantially equal to the specific gravity of the hydrocarbon containing material when said hydrocarbon containing material has specific gravity higher than 10° API.

14. The method of claim 11 wherein said chemical affinity fluid comprises an organic solvent having a specific gravity greater than that of the hydrocarbon containing material when said hydrocarbon containing material has a specific gravity higher than 10° API.

15. The method of claim 11 further comprising:

providing baffle means for separating droplets of said hydrocarbon containing material from said water; and passing said water through said baffle means to separate droplets of hydrocarbon containing material from said water after said water has been placed in contact with said first layer of chemical affinity fluid.

16. The method of claim 11 further comprising collecting said hydrocarbon containing material removed from said water and transporting said collected hydrocarbon containing material from said tank.

\* \* \* \* \*